O. WESSELL, A. NICKEL & R. GROSS.
Pianoforte-Damper Action.
No. 210,381. Patented Nov. 26, 1878.
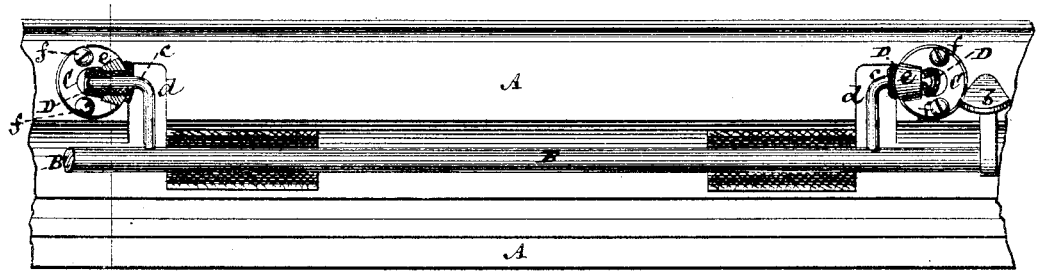
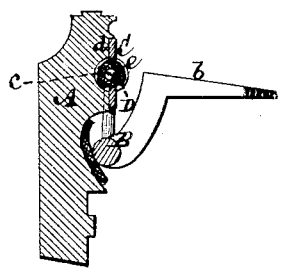
Witnesses
John Becker
Fred. Haynes
Inventor
Otto Wessell
Adam Nickel
Rudolph Gross
by their Attorneys
Brown & Allen

UNITED STATES PATENT OFFICE.

OTTO WESSELL, ADAM NICKEL, AND RUDOLPH GROSS, OF NEW YORK, N. Y.

IMPROVEMENT IN PIANO-FORTE DAMPER-ACTIONS.

Specification forming part of Letters Patent No. 210,381, dated November 26, 1878; application filed November 1, 1878.

*To all whom it may concern:*

Be it known that we, OTTO WESSELL, ADAM NICKEL, and RUDOLPH GROSS, all of the city and State of New York, have invented certain new and useful Improvements in Damper-Actions for Piano-Fortes, of which the following is a description, reference being had to the accompanying drawing, forming part of this specification.

This invention relates to damper-actions for upright piano-fortes in which the main action-rail is of wood, and it more especially refers to the damper-cranks or damper-lifting bars of said actions and the bearings for said cranks or bars. In such actions, as heretofore constructed, the pivots of said cranks or lifting-bars have been conical pointed and fitted in metal bearings to correspond, which bearings have been secured on or within the wooden main action-rail. These pivots, as they become more or less worn, produced rattling or jingling in their bearings, which, of course, marred the harmonious effect of the instrument.

To prevent the wear of the pivots, oil was applied to their bearings; but such was not only troublesome, but on many accounts objectionable. Thus, dust adhering to the oiled surfaces, the pivots were apt to stick in their bearings. Again, the main action-rail, when made of wood, and it is only to such that our invention relates, is more or less liable to warp, and, as the damper-crank pivots and the bearings therefor carried by said rail have heretofore been constructed, a binding effect has been produced on the pivots by the warping of said rail, thus checking freedom of the action or stopping it.

All of these defects our invention obviates, and possesses special advantages in instruments using a wooden main action-rail; and to such and other ends the invention substantially consists in certain novel constructions of the bearings for the pivots of the damper-crank or lifting-bar of the action, and in a combination of said bearings with the damper-crank or lifting-bar, and with the main action-rail, such bearings being fitted with or having combined with them cloth bushes. These bushes are not merely for the purpose of insuring a smooth or noiseless working of the pivots, as in other damper-actions applied to main action-rails of a metallic description, but, by their forming elastic bearings for the pivots, they have the additional important effect, when combined with or applied to a wooden main action-rail, of preventing the binding of the pivots by the warping of said rail.

Figure 1 of the accompanying drawing represents a longitudinal front view of a piano-forte main action-rail in part with the damper-crank or lifting-bar attached and having our invention applied. Fig. 2 is a transverse section of the same on the line $x\,x$; Fig. 3, a view in perspective of one of the bearings for the pivots of the damper-crank detached, and Fig. 4 a view in perspective, of a cloth bushing used in connection with said bearings.

A is the main action-rail, which is of wood, and of any approved form. B is the damper-crank or lifting-bar applied to said rail, $b$ being the lifting-arm of said bar, controlled by the treadle, and $c\,c$ the pivots, which provide for the turning or working of said crank or bar. These pivots are of cylindrical form, and are carried by bearings C C let into the face of the rail and secured to the latter. Recesses $d\,d$ are made in the face of the rail for the connecting portions of the pivots with the main body of the bar to work within.

Each bearing C it is preferred to cast of a circular plate form, as shown in the drawing, and afterward, by the application of a suitable cutting-tool, to trim the outside margin of the bearing, so that, on countersinking a hole to correspond in the face of the rail, said bearing is readily inserted to its place therein after the damper-crank or lifting-bar B has been fitted by its pivots $c\,c$ to the bearings, which latter have cast or formed on one side of their face sockets $e\,e$ to receive the pivots $c\,c$, or rather to receive cloth bushes D D entered within said sockets and receiving the pivots through them. The damper-crank with its bearings having thus been fitted to the main action-rail, the bearings C C may then be secured to their proper places by screws $f\,f$ fastening them to the rail after they have been adjusted or adjusted themselves to the line of the pivots.

It will thus be observed that the circular form of the plate-bearings C C is preferable to any other; but other forms might be adopted and the same benefit be derived from the use of the cloth bushes D D, which, by their elasticity, prevent any sticking of the pivots consequent on the warping of the wooden main action-rail, and are otherwise advantageous as bearing-surfaces for the pivots.

I claim—

1. The combination, with a wooden main action-rail and with the damper-crank or lifting-bar of the instrument, of metallic bearings for the pivots of said crank or bar, secured to the face of the wooden rail and fitted or provided with cloth bushes for said pivots, substantially as specified.

2. The combination of the circular metallic plate-bearings C, having sockets $e$ mounted on their faces, the cloth bushes D inserted within said sockets, the wooden main action-rail A, to or within which the plate-bearings C are secured, and the damper-crank or lifting-bar B, having pivots $c$ fitted to turn within said bushes, essentially as and for the purposes specified.

OTTO WESSELL.
ADAM NICKEL.
RUDOLPH GROSS.

Witnesses:
T. J. KEANE,
FRED. HAYNES.